(12) United States Patent
Yoshimura (10) Patent No.: US 7,013,471 B2
(45) Date of Patent: Mar. 14, 2006

(54) DISK PLAYER

(75) Inventor: Toshio Yoshimura, Kawasaki (JP)

(73) Assignee: Tanashin Denki Co. Ltd., Tokyo (JP)

( * ) Notice: Subject to any disclaimer, the term of this patent is extended or adjusted under 35 U.S.C. 154(b) by 184 days.

(21) Appl. No.: 10/647,052

(22) Filed: Aug. 25, 2003

(65) Prior Publication Data

US 2005/0050565 A1 Mar. 3, 2005

(51) Int. Cl.
GIIB 17/04 (2006.01)

(52) U.S. Cl. ..................................................... 720/620
(58) Field of Classification Search ................. 720/620, 720/621, 622; 369/77.1, 77.2, 75.1, 75.2
See application file for complete search history.

(56) References Cited

U.S. PATENT DOCUMENTS

| 4,641,298 | A | * | 2/1987 | Ikedo et al. | 720/620 |
| 4,764,917 | A | * | 8/1988 | Sugihara et al. | 720/623 |
| 5,274,619 | A | * | 12/1993 | Suzuki | 369/30.78 |
| 6,137,761 | A | * | 10/2000 | Oh et al. | 720/620 |
| 6,411,582 | B1 | * | 6/2002 | Nakatani et al. | 720/620 |
| 6,757,234 | B1 | * | 6/2004 | Fujiwara | 720/620 |
| 6,782,545 | B1 | * | 8/2004 | Kuo | 720/620 |
| 6,826,766 | B1 | * | 11/2004 | Tuchiya | 720/620 |
| 2002/0100337 | A1 | | 8/2002 | Tanaka et al. | |
| 2004/0205790 | A1 | * | 10/2004 | Kuo | 720/620 |

FOREIGN PATENT DOCUMENTS

JP 2000-48445 2/2000

* cited by examiner

Primary Examiner—William Klimowicz
Assistant Examiner—Mark Blouin
(74) Attorney, Agent, or Firm—Bacon & Thomas (57) ABSTRACT

The present invention relates to restrict a disk playing base plate against movement in back-and-forth directions, lateral directions and vertical directions relative to a housing by making use of the movement of a roller holder supporting a disk carrier roller.

A pair of (i.e., left and right) side plates 11 of the roller holder has roller holder contact parts for restricting movement in the back-and-forth, lateral and vertical directions, and the top and bottom plates of the housing have housing contact parts corresponding to the roller holder contact parts. When a disk carrier roller is in a disk carrying position, the front part of the disk playing base plate is restricted against movement in the back-and-forth, lateral and vertical directions relative to the housing.

4 Claims, 9 Drawing Sheets

DISK PLAYER

BACKGROUND OF THE INVENTION

1. Field of the Invention

This invention relates to a disk player, in which a roller holder supporting a disk carrier roller restricts a disk playing base plate supported in a floating state on a housing against movement relative to the housing.

2. Description of the Prior Art

In a disk player, mainly mounted for use in a vehicle, a pick-up, a turntable, a clamp, etc. are mounted on a disk playing base plate, which is supported in a floating state in a housing. In the playback time of this disk player, the pick-up, the turntable, the clamp, etc. are held to be free form being adversely affected by externally applied vibrations. Also, in the non-playback time, a front and a rear part of the disk playing base plate are restricted against movement relative to the housing in an axis of the disk player, which axis extends along a disk transfer path. Various prior art devices for restricting the movement of the disk playing base plate are proposed.

Figure 10:
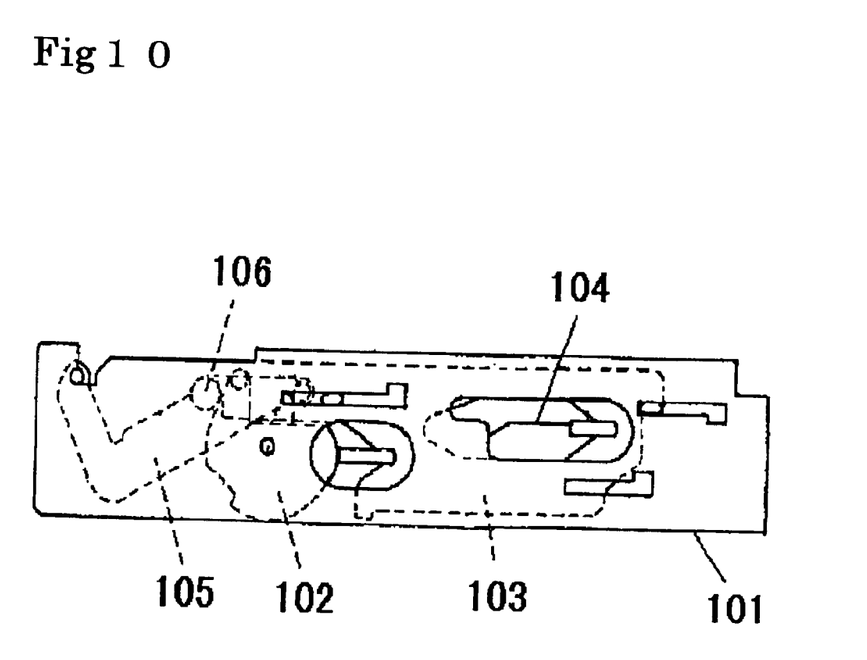
FIG. 10 shows part of a prior art vehicle-mounted disk player.

FIG. 10 shows part of a vehicle-mounted disk player disclosed in Japanese Disclosure No. 2000-48445. In this disk player, a roller holder 105 supporting a disk carrier roller 106 is engaged with an arm member 102 mounted on a housing 101 to restrict a front part of a disk playing base plate 104 in the axis direction along the disk transfer path against movement relative to the housing 101, and movement of the arm member 102 causes sliding of a slide member 103 in the housing 101 into engagement with a rear part of the disk playing base plate 104 to restrict a rear part of the disk playing base plate 104 against movement.

Specifically, the arm member 102 and the slide member 103 are mounted in the housing 101, and when the roller holder 105 mounted on the disk playing base plate 104 is raised to move the disk carrier roller 106 to a disk carrying position, it comes to engagement with the arm member 102 to cause sliding of the slide member 103 via the arm member 102. The disk playing base plate 104 is restricted against vertical movement with the slide part 103 brought into engagement with it, while its back-and-forth movement in the axis of the disk playing base plate 104 is restricted with the engagement of the roller holder 105 and the arm member 102 with each other.

With the disk carrier roller 106 brought to a disk non-carrying position, the restriction of the disk playing base plate 104 against movement relative to the housing 101 is released.

In the above prior art disk player, the arm member 102 is necessary for restricting the disk playing base plate 104 against movement, thus leading to component number increase. In addition, since it is necessary to cause sliding of the slide member 103 via the arm member 102, with which the roller holder 105 is brought into engagement, the arrangement is complicated, leading to the problem of manufacturing cost increase.

Furthermore, as for the restriction of the disk playing base plate 104 against movement, while the restriction against the back-and-forth movement of the disk playing base plate 104 in the axis is effected with the engagement of the roller holder 105 and the arm member 102 with each other, the restriction of the disk playing base plate 104 against vertical movement in the vertical directions is effected with the engagement of the slide member 103 and the disk playing base plate 104 in the rear or depth side and the center of the disk player in the axis along the disk transfer path. To facilitate the loading and unloading of disk, therefore, restriction of the disk playing base plate 104 in the neighborhood of a disk inserting slot which is found on the front side of the disk playing base plate 104 is important. Nevertheless, the above prior art disk player has a problem that the restriction of the disk playing base plate 104 against movement in the neighborhood of the disk inserting slot is not reliably made. Besides, no consideration is given to the restriction of the disk playing base plate 104 against lateral movement in the transverse direction of the disk player.

The present invention is made to solve the above problems, and its object is to provide a disk player, which has a roller holder supporting a disk carrier roller adapted to restrict a front part of a disk playing base plate against movement relative to a housing in the back-and-forth directions in an axis of the disk player, which axis extends along a disk transfer path, the lateral direction normal to said axis and vertical movement in the vertical directions of it, thus has a reduced number of components and a simplified arrangement to permit its manufacture at a reduced cost, and particularly is capable of reliably restricting the disk playing base plate against movement in the neighborhood of a disk inserting slot.

SUMMARY OF THE INVENTION

The disk player according to the invention is in such an arrangement that a disk carrier roller is rotatably supported at its opposite ends in a pair of, i.e., left and right, side plates of a roller holder, which is mounted together with a pick-up and other members in a disk playing base plate, and is adapted to be selectively positioned in a disk carrying position and a disk non-carrying position and, with the disk carrier roller in the disk non-carrying position, the disk carrying base plate is supported in a floating state in a housing, while with the disk carrier roller in the disk carrying position, the front and rear parts of the disk playing base plate in the axis of the disk player along the disk transfer path are restricted against movement relative to the housing in back-and-forth directions in said axis, transverse or lateral direction to said axis and upward/downward directions in its vertical directions, that the roller holder is disposed in the above front part of it and has the pair side plates, which have front and rear roller holder contact parts extending in the axis along the disk transfer path, left and right roller holder contact parts extending in its transverse direction and upper and lower roller holder contact parts extending in its vertical directions, that a top and a bottom plate of the housing have housing contact parts formed in front parts in said axis such as to correspond to the roller holder contact parts, respectively, and that with the disk carrier roller in the disk carrying position the above front part of it is restricted against movement relative to the housing.

Particularly, by forming the roller holder from a metal plate, it is possible to reduce the thickness of the disk player. Furthermore, according to the invention a disk player is provided, in which at least one of the pair side plates has an upper protuberance having the front roller holder contact part, at least either the left or right roller holder contact part and the upper roller holder contact part and a lower protuberance having the rear roller holder contact part, the other one of the left and right roller holder contact parts and the lower roller holder contact part, the top plate of the housing has an engagement aperture having housing contact parts corresponding to the front roller holder contact part, the left or right roller holder contact part and the upper roller holder contact part, and the bottom plate of the housing has an engagement aperture having housing contact parts corresponding to the rear roller holder contact part, the other one of the left and right roller holder contact parts and the lower roller holder contact part. With the roller holder provided with the upper and lower protuberances and the top and bottom plates of the housing can be provided with engagement apertures, the arrangement can be further simplified.

BRIEF DESCRIPTION OF THE DRAWINGS

These and other objects, features and advantages of the invention will become more apparent upon reading of the following detailed description when the same is read with reference to the accompanying drawings, in which.

DETAILED DESCRIPTION OF THE PREFERRED EMBODIMENTS

Figure 1:
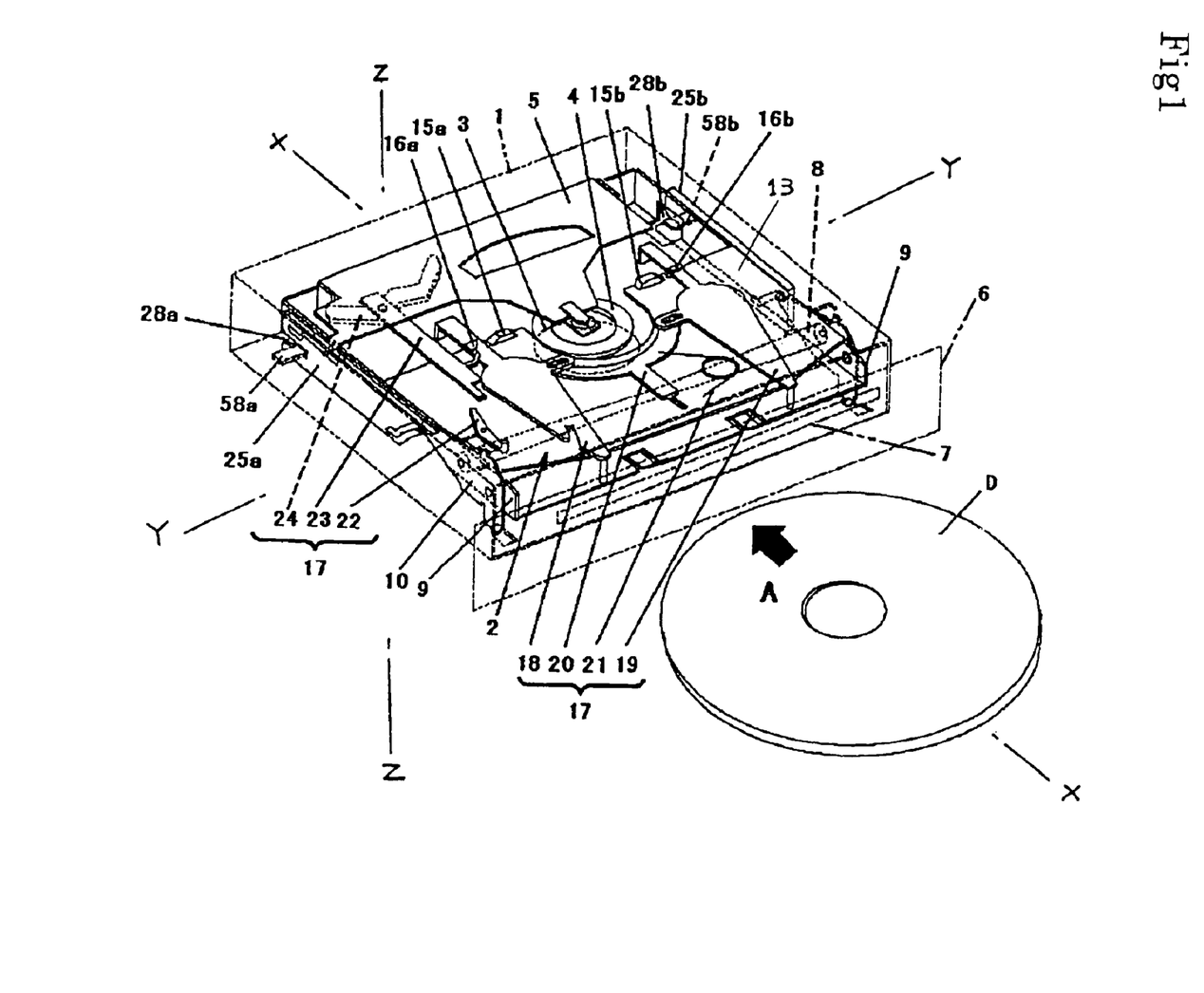
FIG. 1 is a schematic representation of an embodiment of the disk player according to the invention.

One embodiment of the invention will now be described with reference to the drawings. FIG. 1 is a perspective view showing the internal mechanism of a vehicle-mounted disk player, with a housing 1 shown in phantom lines.

A disk D to be loaded is inserted into the housing 1, as shown by arrow A, from a front side part thereof in an axis X—X of the disk player, which axis extends along a disk transfer path defined in the housing 1. As shown in FIG. 1, with respect to the axis X—X of the disk player, an axis in the transverse directions is shown as Y—Y, and an axis in the vertical directions is shown as Z—Z. The showing of the axes X—X, Y—Y and Z—Z in the other Figures is the same as in FIG. 1.

A disk playing base plate 2 is supported in a floating state via a buffer member in the housing 1. A turntable 3 is mounted on the disk playing base plate 2 at the center thereof, and a pick-up (not shown) is also mounted on the disk playing base plate 2 such as to be movable toward a corner thereof.

A clamp 4 is disposed above the turntable 3 such that it is rotatably supported by a clamp arm 5. The clamp arm 5 is rotated toward and away from the turntable 3.

A cabinet 6 (shown by phantom lines) which is disposed on the front of the housing 1, has a front part provided with a disk inserting slot 7 for inserting the disk D therefrom.

Figure 2:
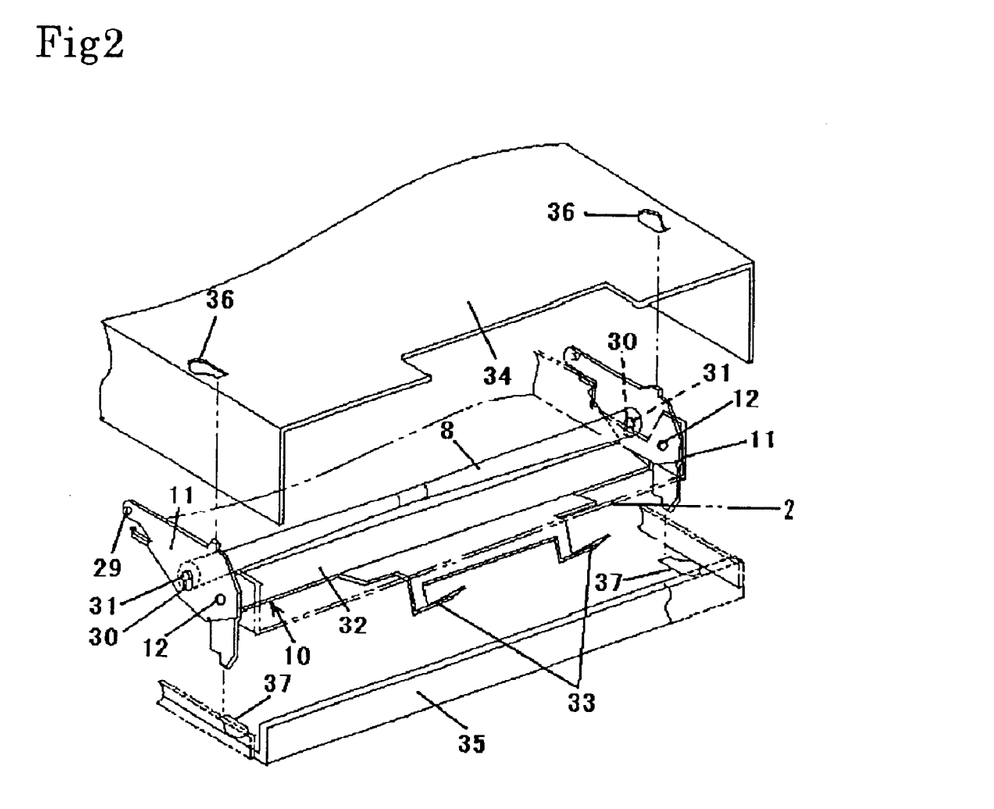
FIG. 2 is a fragmentary enlarged-scale perspective view showing a roller holder and the peripheral part thereof in the embodiment of the disk player according to the invention.

That is, the disk inserting slot 7 is found on a front part of the disk player in the axis X—X. In a front part of the housing 1, a disk carrier roller 8 (shown by phantom lines) for carrying the disk D is disposed. The disk carrier roller 8 has its opposite ends rotatably supported in a roller holder 10, which is formed from a metal sheet and rotatably mounted on opposite side wall parts 9 of the disk playing base plate 2. As shown in FIG. 2, the roller holder 10 has a pair of, i.e., left and right, side plates 11 in the transverse axis Y—Y of the disk player, and the side plates 11 each have a mounting hole 12. The roller holder 10 is rotatably mounted at its mounting holes 12 in the left and right side wall parts 9 of the disk playing base plate 2, so that its rotation causes movement of the disk carrier roller 8 between an upper disk carrying position and a lower disk non-carrying position.

As shown in FIG. 1, a guide member 13 made from a metal sheet is provided above the disk playing base plate 2, and by causing rotation of the disk carrier roller 8 the disk D is carried forth in its state clamped between the guide member 13 and the disk carrier roller 8. The guide member 13 has its deepest part having upwardly projecting cams 15a and 15b and tongue parts 16a and 16b.

At the upper side of the guide member 13, a disk detecting mechanism 17 is disposed, which starts drive sources of the roller holder 10 and the disk carrier roller 8 when it detects the insertion of the disk D. The disk detecting mechanism 17 has a function of controlling the extent of carrying of the inserted disk D according to the diameter thereof. The disk detecting mechanism 17 has a pair of, i.e., left and right, disk sensors 18 and 19, which can be horizontally rocked on the top of the guide member 13. When the disk D is inserted, the two disk sensors 18 and 19 are rocked apart by the disk D to increase the distance between them, and according to the extent of rocking movement it is checked that the inserted disk D has a large or a small diameter.

The disk detecting mechanism 17 further includes a coupling member 20 for synchronizing the movements of the disk sensors 18 and 19, a torsion spring 21 biasing the disk sensors 18 and 19 in the closing direction thereof, a lock lever 22 for locking the disk sensors 18 and 19 in the open positions thereof when a large size disk is inserted, and a movable member 23 advanced and retreated with rocking of the disk sensors 18 and 19. A trigger lever 24 (shown by phantom lines) is coupled to the movable member 23 at the depth thereof, and it serves to cause start and stop a clamp drive mechanism and a disk carrying mechanism (the two being not shown).

Slide members 25a and 25b are mounted on the left and right side wall part of the disk playing base plate 2 such as to be slidable back and forth in the axis X—X.

FIGS. 3 to 6 are left side views showing the internal mechanism of the disk player in respective states. As shown in these Figures, the slide member 25a has a front part (i.e. right part in the Figures) in the axis X—X in the disk player formed with a cam slot 26a and are a rear part (i.e., left part in the Figures) formed with a slant slot 27 having a slanted part and also with as slit 28a. A protuberance 29 provided on the roller holder 10 is inserted in the cam slot 26a, and a part of the clamp arm 5 is inserted in the slant slot 27. With back-and-forth movement of the slide member 25a in the axis X—X, the protuberance 29 is moved along the cam slot 26a to cause rocking of the roller holder 10 about the mounting hole 12. With the rocking movement of the roller holder 10 caused by the back-and-forth movement of the slide member 25a, the disk carrier roller 8 is selectively brought to either the disk carrying portion or the disk non-carrying position. Also, with part of the clamp arm 5 inserted in the slant slot 27 of the slide member 25*a*, the clamp arm 5 is also rocked to bring the clamp 4 into contact with the turntable 3 or separate the clamp 4 therefrom. The other slide member 25*b* also has a cam slot 26*b* and a slit 28*b*, with protuberance 29 of roller holder 10 inserted in the cam slot 26*b*. Thus, back-and-forth movement of the slide member 25*a* causes interlocked back-and-forth movement of the slide member 25*b*.

Figure 6:
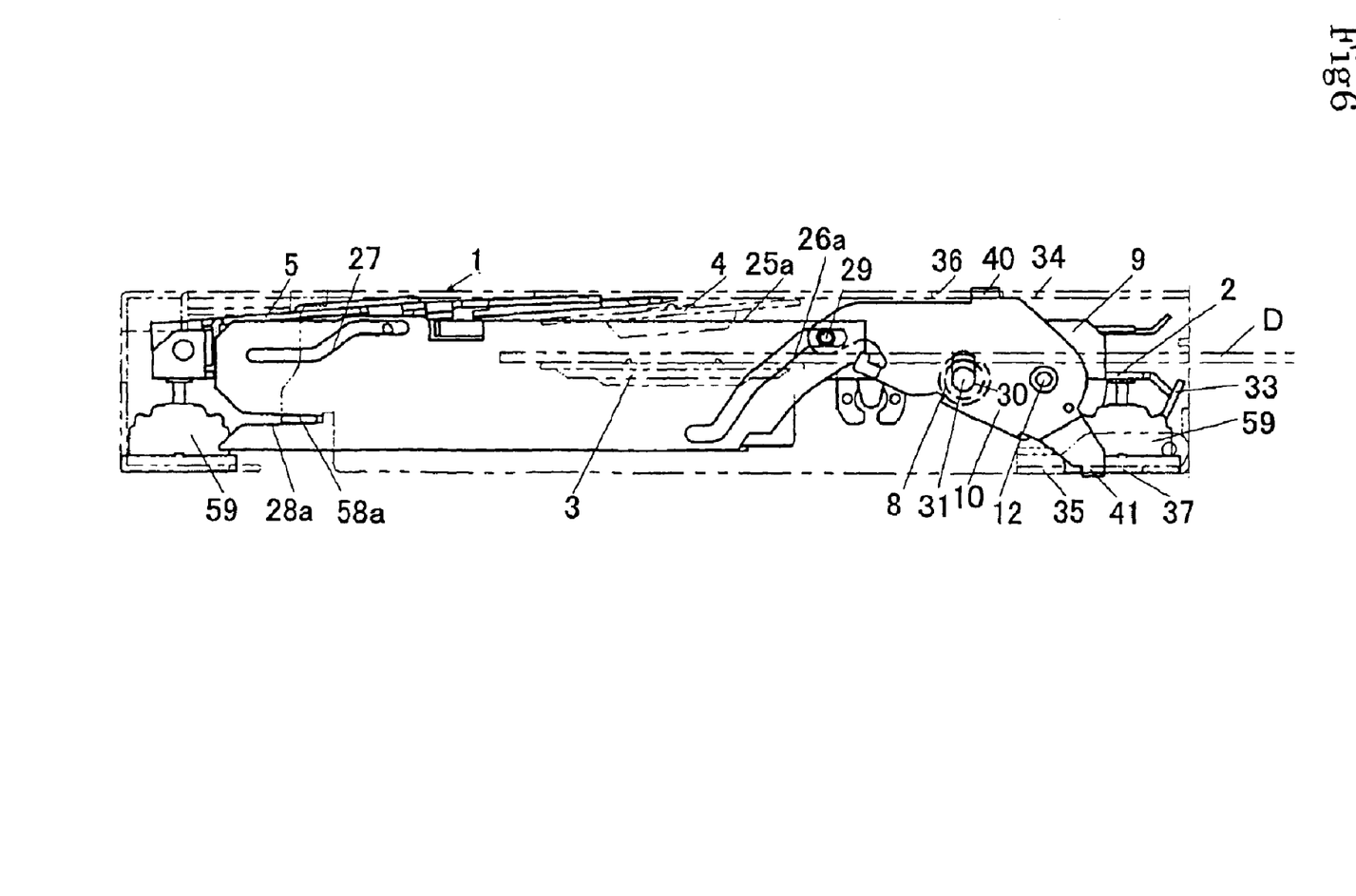

FIG. 2 shows the relation between the roller holder 10 and the disk carrier roller 8. The left and right side plates 11 of the roller holder 10 in the transverse axis Y—Y, have vertically elongate slots 30, in which opposite end shaft parts 31 of the disk carrier roller 8 are inserted. The end shaft parts 31 are independently vertically movable in the slots 30. Between the end shaft parts 31 and a bottom member 32 of the roller holder 10, a left and a right spring (not shown) are interposed to bias the disk carrier roller 8 toward the disk D. The roller holder 10 has a pair of V-shaped extensions 33 extending from its front central part. The extensions 33 serve as double insertion preventing members to have the disk insertion or transfer path blocked when the disk D is loaded in the playback position, as shown in FIG. 3, and to have the disk insertion or transfer path opened when no disk D is loaded, as shown in FIG. 6.

Figure 7:
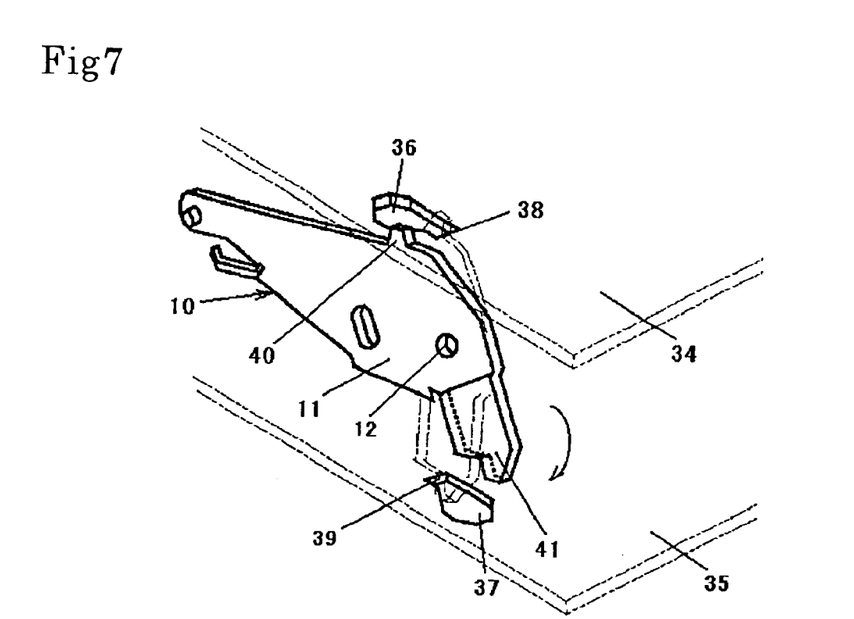
FIG. 7 is a fragmentary enlarged-scale perspective view showing the relation between roller holder and housing in the disk player shown in FIG. 1 according to the invention.

As shown in FIG. 7, the top and bottom plates 34 and 35 of the housing 1 have engagement apertures 36 and 37. Each engagement aperture 36 of the top plate 34 has a forward recess 38, and each engagement aperture 37 of the bottom plate 35 has a rearward recess 39. The left and right side plates 11 of the roller holder 10 each have an upper and a lower protuberance 40 and 41.

Figure 3:
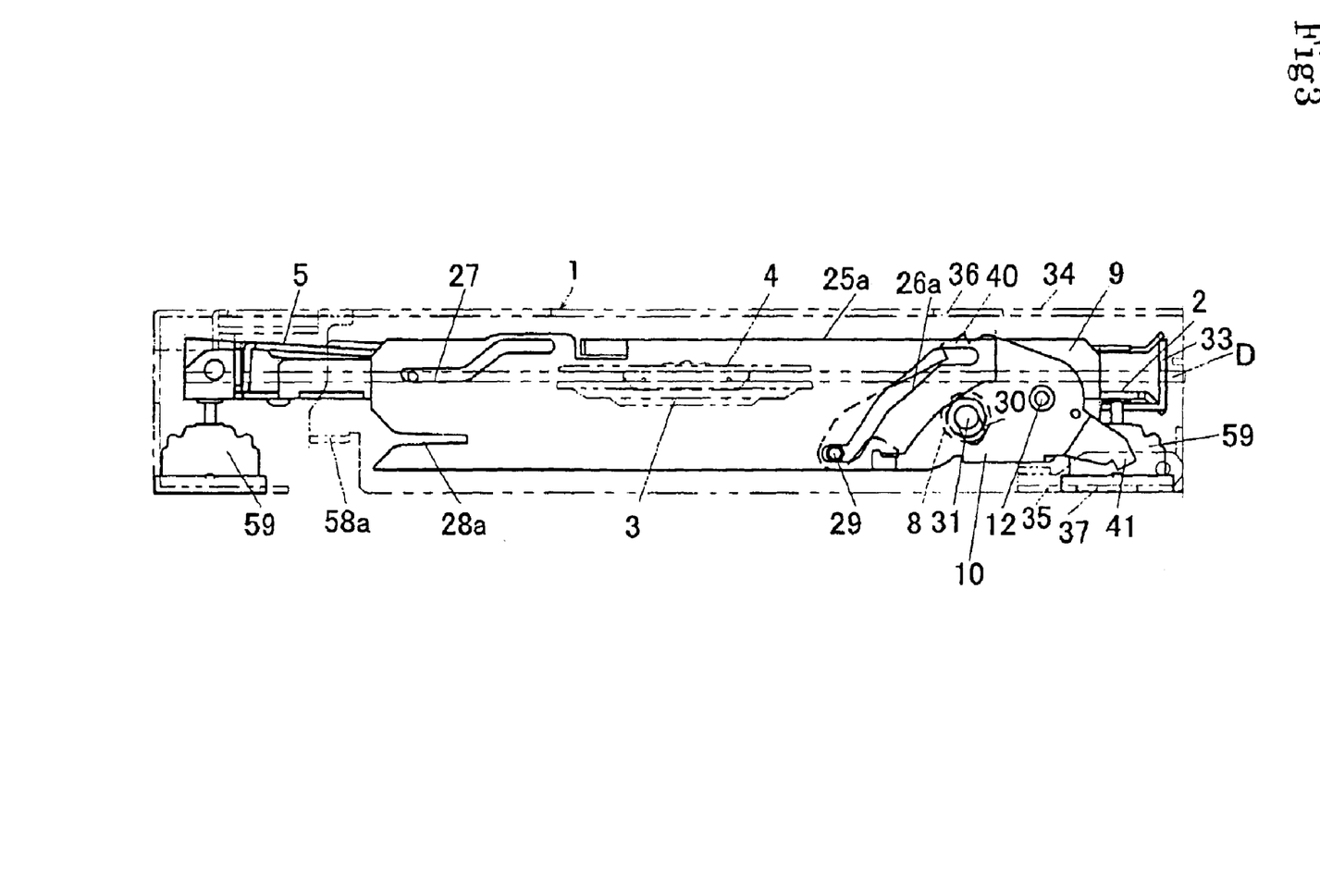
FIGS. 3 to 6 are side views showing the disk player shown in FIG. 1 according to the invention in different states attained with movement of the disk player as a disk being loaded or unloaded.

With rocking of the roller holder 10 about the mounting holes 12 in the clockwise direction (i.e., direction of arrow) as shown in FIGS. 3 and 7, as shown by phantom lines in FIG. 7, the upper and lower protuberances 40 and 41 provided on the roller holder 10 are inserted in the engagement apertures 36 and 37, respectively.

Figure 8:
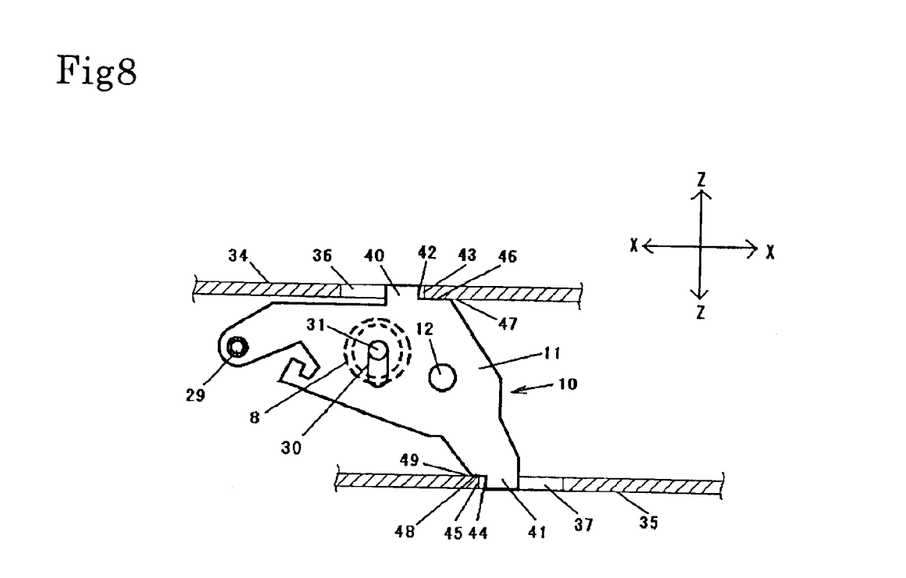
FIG. 8 is a fragmentary enlarged-scale side sectional view showing the engagement relation between roller holder and housing shown in FIG. 7.
Figure 9:
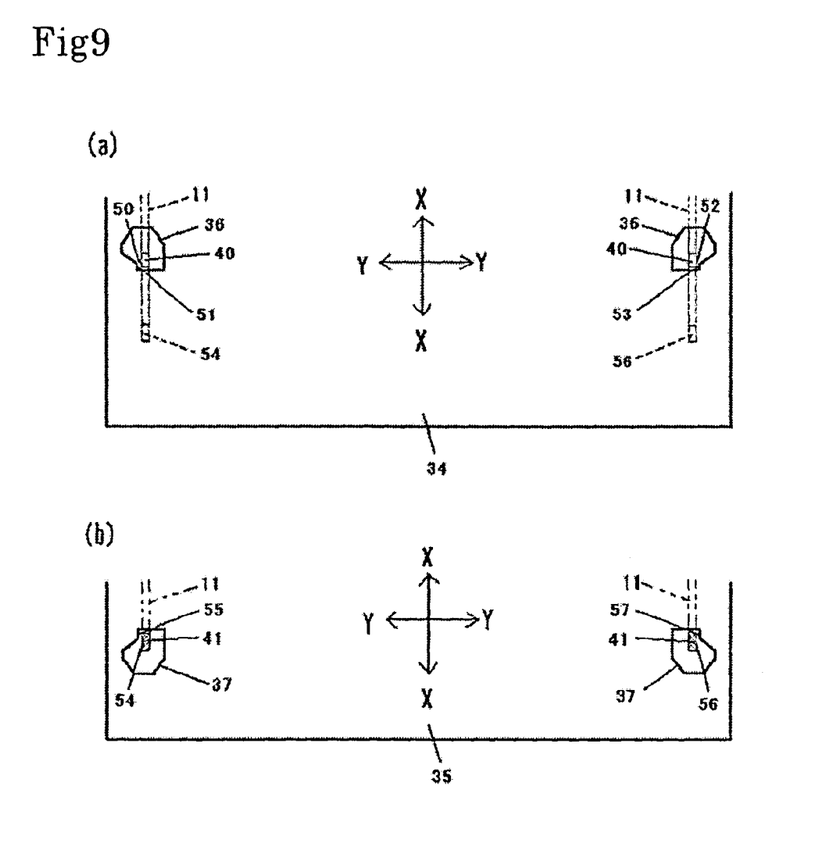
FIGS. 9(a) and 9(b) are fragmentary enlarged-scale plan views showing the arrangement of the housing in relation to FIG. 8, FIG. 9(a) showing the arrangement of top plate, FIG. 9(b) showing the arrangement of bottom plate.

FIG. 8 is a left side view, partly in section, showing the state that the upper and lower protuberances 40 and 41 are inserted in the engagement apertures 36 and 37. FIGS. 9(*a*) and 9(*b*) are plan views showing the top and bottom plates 34 and 35, respectively, in the same state. As shown in FIG. 8, a front roller holder contact part 42 of the upper protuberance 40 in the axis X—X for restriction in the forward direction is located to be in contact with a front housing contact part 43 of the engagement aperture 36, and a rear roller holder contact part 44 of the lower protuberance 41 in the axis X—X for restriction in the rearward direction is located to be in contact with a rear housing contact part 41 of the engagement aperture 37. Thus, a front part of the disk playing base plate 2 can be restricted against back-and-forth movement relative to the housing 1 by the engagement of the roller holder contact parts 42 and 44 and the housing contact parts 43 and 45 with one another. The side plate 11 has an upper roller holder contact part 46 forwardly of the front roller holder contact part 42 in the vertical axis Z—Z, the upper roller holder 46 being located to be in contact with an upper housing contact part 47 of the top plate 34, and it also has a lower roller holder contact part 48 rearward of the rear roller holder contact part 44, the lower roller holder contact part 48 being located to be in contact with a lower housing contact part 49 of the bottom plate 35. Thus, the front part of the disk playing base plate 2 can be restricted against movement in vertical directions in the axis Z—Z relative to the housing 1 by the engagement of the roller holder contact parts 46 and 48 and the housing contact parts 47 and 49 with one another.

As shown in FIG. 9(*a*), the left side surface of the upper protuberance 40 constitutes an upper left roller holder contact part 50 located to be in contact with an upper left housing contact part 51 of the engagement aperture 36 when it is inserted therein. Likewise, the right side surface of the upper protuberance 40 constitutes an upper right roller holder contact part 52 located to be in contact with an upper right housing contact part 53 of the engagement aperture 36 when it is inserted therein. Also, as shown in FIG. 9(*b*), the left side surface of the lower protuberance 41 constitutes a lower left roller holder contact part 54 located to be in contact with a lower left housing contact part 55 of the engagement aperture 36 when it is inserted therein. Likewise, the right side surface of the Lower protuberance 41 constitutes a lower right roller holder contact part 56 located to be in contact with a lower right housing contact part 57 of the aperture 37 when it is inserted therein. Thus, the front part of the disk playing base plate 2 can be restricted against lateral movement in the transverse axis Y—Y relative to the housing 1 by the engagement of the roller holder contact parts 50, 52, 54 and 56 and the corresponding housing contact parts 51, 53, 55 and 57 with one another.

As shown in FIG. 6, in the slit 28*a* of the slide member 25*a* an engagement piece 58*a* provided on the housing 1 is engaged. Likewise, in the slit 28*b* of the opposite side slide member 25*b* the engagement piece 58*b* of the housing 1 is engaged. Thus, with the engagement of the roller holder contact parts 42, 44, 46, 48, 50, 50, 52, 54 and 56 provided on the roller holder 10 and the corresponding housing contact parts 43, 45, 47, 49, 51, 53, 55 and 57 provided in the housing 1 with one another, the front part of the disk playing base plate 2 is restricted against movement in the back-and-forth directions in the axis X—X of the disk player, in lateral directions in the transverse axis Y—Y and in the vertical directions in the vertical axis Z—Z relative to the housing 1, and with the engagement of the slits 28*a* and 28*b* of the slide members 25*a* and 25*b* and the engagement pieces 58*a* and 58*b* on the housing 1, the rear part of the disk playing base plate 2 is restricted against vertical movement relative to the housing 1. With rocking of the roller holder 10 in the opposite direction, and upper and lower protuberances 40 and 41 are detached from the engagement apertures 36 and 37, and also the engagement pieces 58*a* and 58*b* of the housing 1 are detached from the slits 28*a* and 28*b* of the slide members 25*a* and 25*b*, thus releasing the above restriction against movement.

The operation of this embodiment will be described.

First, a sequence operation from a state that a disk D has been loaded on the turntable 3 and a disk playing operation has been started until the disk D is ejected with the disk playing base plate 2 restricted against movement relative to the housing 1.

In the state that the disk playing operation is in force, as shown in FIG. 3, the slide member 25*a* is at a position most forward of the housing 1 (i.e., rightward in the Figure), and the protuberance 29 of the roller holder 10 is located in a lower end horizontal part of the cam slot 26*a*. At this time, the opposite side slide member 25*b* is also at a position most forward of the housing 1.

Also, the upper protuberance 40 of the roller holder 10 is held separated from the engagement aperture 36 of the top plate 34. The lower protuberance 41 is also held separated from the engagement aperture 37 of the bottom plate 35. The disk playing base plate 2 is supported in a floating state in the housing 1 via a buffer member 59. A part of the clamp arm 5 is at the lower end position of the slanted slot 27 of the slide member 25a, and the disk D is held clamped between the clamp 4 and the turntable 3. The clamp arm 5 is biased downward by a spring (not shown).

Figure 4:
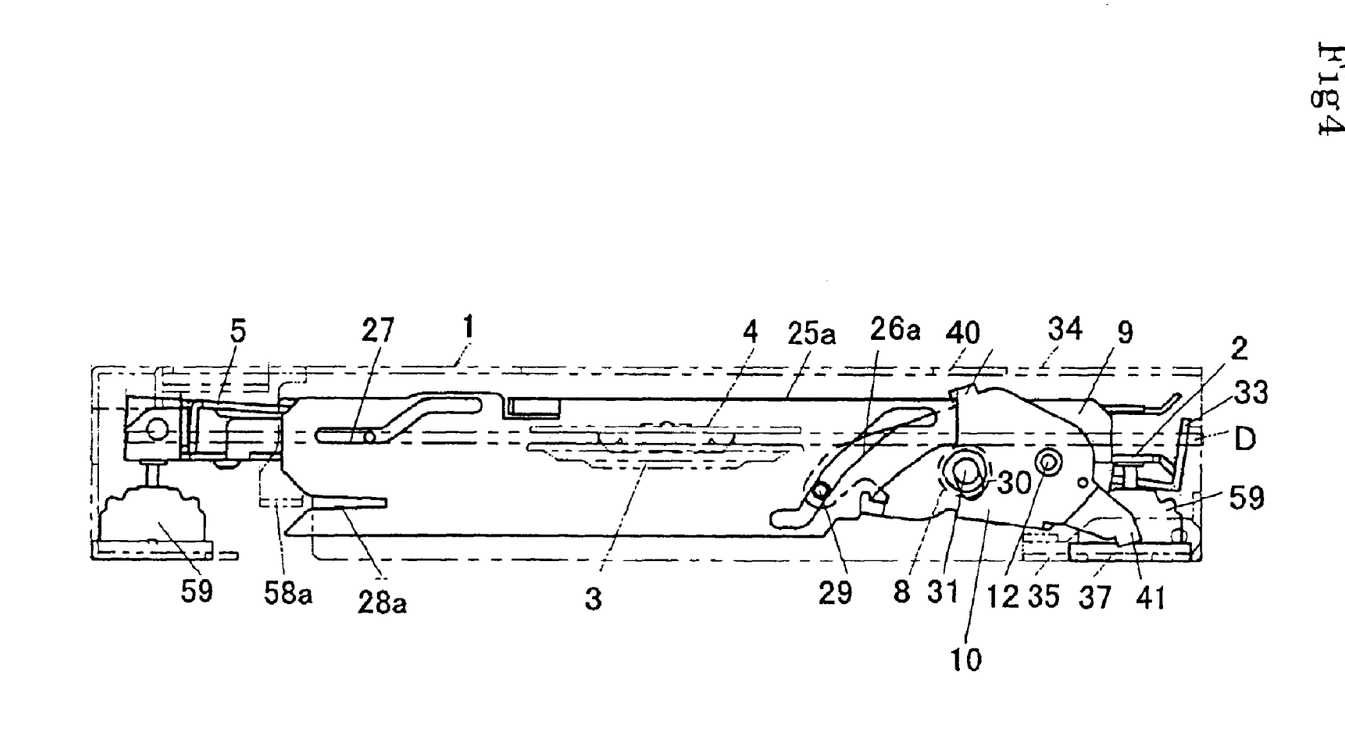

In this state, by triggering the operation of ejecting the disk D a loading motor (not shown) is started and, as shown in FIG. 4, the slide member 25a is moved rearward (i.e. to the left side) of the housing 1. With this movement, the protuberance 29 of the roller holder 10 is moved upward along the cam slot 26a of the slide member 25a, causing clockwise rocking of the roller support 10 about the mounting hole 12 to upwardly bring the disk carrier roller 8 supported by the roller holder 10 into contact with the disk D. At this time, the left and right slide members 25a and 25b are simultaneously moved rearward (i.e., to the let side in the Figure) of the housing 1.

Figure 5:
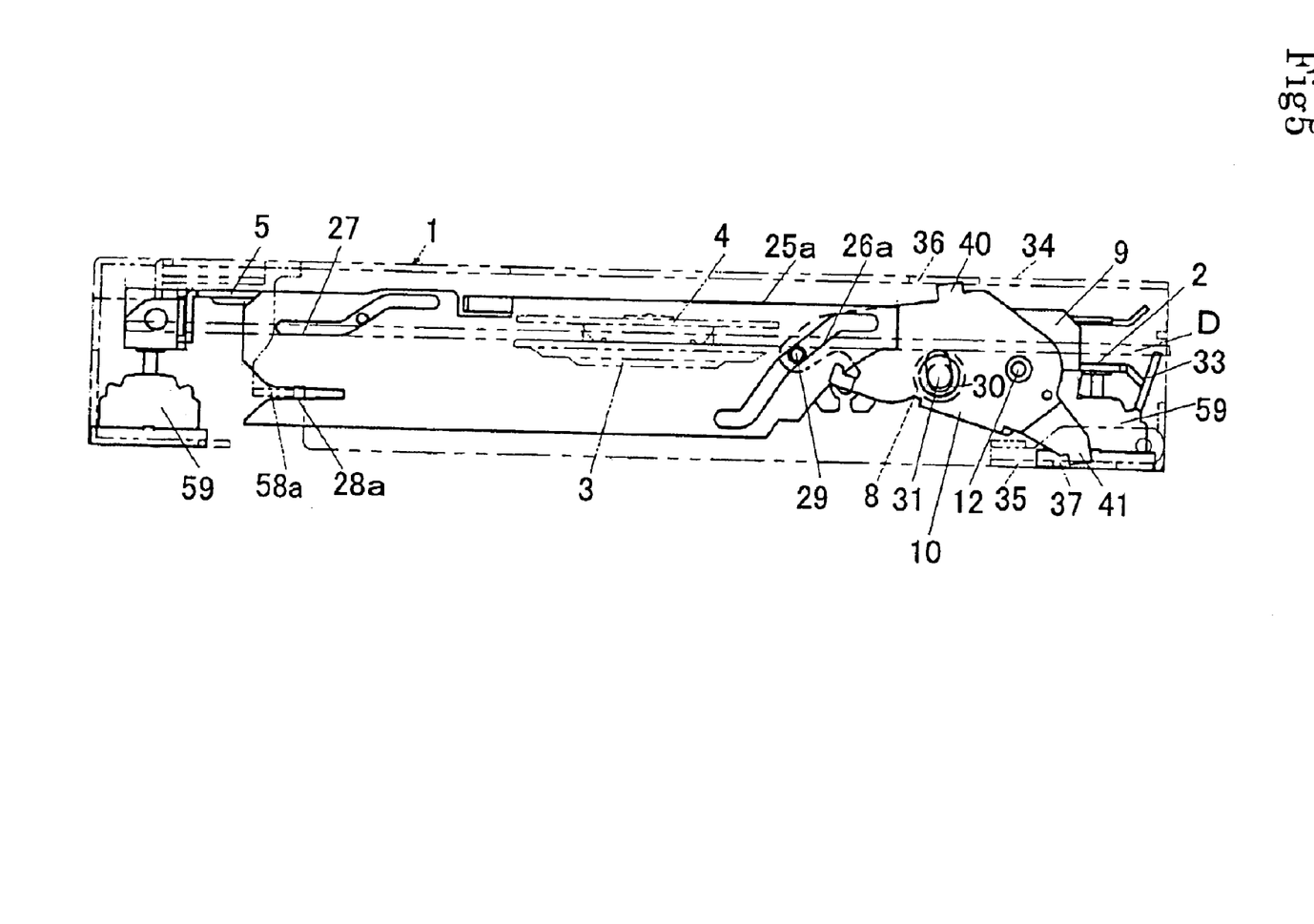

With further rearward movement of the slide member 25a, as shown in FIG. 5, the roller holder 10 is further rocked in the clockwise direction, causing the upper and lower protuberances 40 and 41 to be inserted in the engagement apertures 36 and 37 of the top and bottom plates 34 and 35. At this time, the disk carrier roller 8 supported by the roller holder 10 upwardly pushes the disk D with the biasing force of a spring (not shown). The movement of the slide member 25a causes upward movement of the slant part of the slanted slot 27, causing the clamp arm 5 to be pushed upward and separating the clamper 4 from the turntable 3. At this time, the engagement pieces 58a and 58b of the housing 1 are engaged in the slits 28a and 28b of the slide members 25a and 25b, thus restricting the disk playing base plate 2 against vertical movement relative to the housing 1.

As shown in FIG. 6, when the slide member 25a is further moved rearward to the utmost extent to cause further clockwise rocking for the roller holder 10, the upper and lower protuberances 40 and 41 are perfectly inserted in the engagement apertures 36 and 37. Thus, the disk playing base plate 2 is restricted against movement in the back-and-forth, lateral and vertical directions in the axes X—X, Y—Y and Z—Z relative to the housing 1.

At this time, a part of the clamp arm 5 comes to the top end of the slanted slot 27, thus perfectly separating the clamp 4 from the disk D. The disk D comes to be clamped between the disk carrier roller 8 and the guide member 13, and the disk carrier roller 8 is driven for rotation by the above disk loading motor, thus ejecting the disk D.

Now, a process from a state after the ejection of the disk D with the disk playing base plate 2 restricted against movement relative to the housing 1 until the disk playing operation is started by loading the disk D, will be described.

In the state with the disk playing base plate 2 restricted against movement relative to the housing 1, the disk carrier roller 8 is held pushed against the guide member 13 by spring (not shown). When the disk D is inserted between the disk carrier roller 8 and the guide member 13 as shown in FIG. 6, the disk detecting mechanism 17 detects this insertion to start the loading motor, causing rotation of the disk carrier roller 8 to carry the disk D to the position between the turntable 3 and the clamp 4. The slide member 25a is driven by the loading motor and moved forwardly (i.e., to the left side in the Figure) of the housing 1.

With the forward movement of the slide member 25a, the roller holder 10 is moved in the counterclockwise direction, and after passing the states in FIGS. 5 and 4, it is brought to the state in FIG. 3 that its upper and lower protuberances 40 and 41 are separated from the engagement apertures 36 and 37 of the top and bottom plates 34 and 35 of the housing 1.

The disk playing base plate 2 is thus supported in a floating state in the housing 1 via the buffer member 59. Also, a part of the clamp arm 5 is lowered along the slanted slot 27a of the slide member 25a, whereby the disk D is clamped between the camp 4 and the turntable 3.

It will be appreciated that when a different disk is to be erroneously inserted with the disk D in the loaded state, the insertion is prevented by the extension parts 33 of the roller holder 10 provided in the disk insertion or transfer path.

With the arrangement form of the embodiment as shown above, by causing engagement of the roller holder contact parts 42, 44, 46, 48, 50, 52, 54 and 56 provided in the roller holder 10 with the corresponding housing contact parts 43, 45, 47, 49, 51, 53, 55 and 57 provided in the top and bottom plates 34 and 35 of the housing 1 the front part of the disk playing base plate 2 is restricted against movement in the back-and-forth directions (X—X), lateral directions (Y—Y) and vertical directions (Z—Z) relative to the housing 1 in the neighborhood of the disk inserting slot 7 loaded in the front of the disk player in the axis X—X, and also by causing engagement of the engagement pieces 58a and 58b of the housing 1 in the slots 28a and 28b of the slide members 25a and 25b the rear part of the disk playing base plate 2 is restricted against vertical movement. Thus, the disk player can have a reduced number of components, be simplified in arrangement and be capable of being manufactured at a reduced cost as well as permitting readier loading and unloading of disk.

Particularly, by forming the roller holder 10 from a metal sheet, it is possible to reduce the thickness of the disk player. Furthermore, at least either one of the left and right side plates 11 is provided with the upper protuberance 40 having the front roller holder contact part 42, the upper left roller holder contact part 50, upper right roller holder contact part 52 and the upper roller holder contact part 56 and also with the lower protuberance 41 having the rear roller holder contact part 44, the lower left roller holder contact part 54, the lower right roller holder contact part 56 and the lower roller holder contact part 48, the top plate 34 of the housing 1 is provided with the engagement aperture or apertures 36 each having the housing contact parts 43, 51, 53 and 47 corresponding to the front roller holder contact part 42, the upper left roller holder contact part 50, the upper right roller holder contact part 52 and the upper roller holder contact part 46, and the bottom plate 35 of the housing 1 is provided with the engagement aperture or apertures 37 each having the housing contact parts 45, 55, 57 and 49 corresponding to the rear roller holler contact part 44, the lower left roller holder contact part 54, the lower right roller holder contact part 56 and the lower roller holder contact part 48. Thus, since it is possible to provide the roller holder 10 with the upper and lower protuberances 40 and 41 and provide the top and bottom plates 34 and 35 with the engagement apertures 36 and 37, the arrangement can be further simplified.

While in the above embodiment the roller holder 10 is provided with the upper and lower protuberances 40 and 41 while providing the top and bottom plates 34 and 35 with the engagement apertures 36 and 37, it is possible as well to provide the roller holder with engagement apertures and provide the housing side with protuberances. Furthermore, it is possible to provide at least either one of the left and right side plates 11 of the roller holder 10 with protuberances.

As has been described in the foregoing, according to the invention, in a disk player for selectively restricting a disk playing base plate 2 against movement in back-and-forth directions, lateral directions and vertical directions relative to a housing 1, a roller holder 10 is disposed in a front part of the disk playing base plate 2, and a front part of the disk playing base plate is restricted against movement in the back-and-forth directions, the lateral directions and the vertical directions by the engagement between roller holder contact parts of the roller holder and corresponding housing contact parts of the housing. Thus, it is possible to provide a disk player, which has a reduced number of components, is simplified in arrangement and can be manufactured at a low cost. Particularly, by forming the roller holder 10 from a metal sheet, it is possible to reduce the thickness dimension of the disk player. Furthermore, at least either the left or the right side plate of the roller holder 10 is provided with an upper protuberance having a front roller holder contact part, an upper left roller holder contact part and an upper roller holder contact part and also with a lower protuberance having a rear roller holder contact part, a lower left roller holder contact part, a lower right roller holder contact part and a lower roller holder contact part, the top plate of the housing is provided with engagement apertures each having housing contact parts corresponding to a front roller holder contact part, an upper left roller holder contact part, an upper right roller holder contact part and an upper roller holder contact part, respectively, of the upper protuberance, and the bottom of the housing is provided with engagement apertures each having housing contact parts corresponding to a rear roller holder contact part, a lower left roller holder contact part, a lower right roller holder contact part and a lower roller holder contact part, respectively, of the lower protuberance. Since it is possible to provide the roller holder with the upper and lower protuberances and also provide the top and bottom plates with the engagement apertures, the arrangement can be further simplified.

What is claimed is:

1. A disk player, in which:

a disk carrier roller is rotatably supported at the opposite ends by a pair of side plates of a roller holder disposed transversely of an axis of the disk player, which axis extends along a disk transfer path, said roller holder being mounted together with a pick-up and other components on a disk playing base plate;

said disk carrier roller is selectively located at a disk carrying position and a disk non-carrying position with rocking of the roller holder;

said disk playing base plate is supported in a floating state in the housing having a top and a bottom plate when the disk carrier roller is in the disk non-carrying position; and when the disk carrier roller is in the disk carrying position, a front and a rear part of the disk playing base plate are restricted against movement in back-and-forth directions in said axis of the disk player, in a lateral direction to said axis of the disk player and in vertical direction of the disk player relative to a housing;

said roller holder is disposed on said front part of the disk playing base plate;

said pair of side plates of the roller holder each have a front and a rear roller holder contact part in said axis of the disk player, left and right roller holder contact parts in the lateral directions of the disk player and an upper and a lower roller holder contact part in the vertical directions of the disk player;

said top and bottom plates of the housing have housing contact parts formed in their front part in said axis of the disk player in correspondence to the roller holder contact parts, respectively; and when the disk carrier roller is in the disk carrying position, the front part of the disk playing base plate is restricted against movement relative to the housing by the engagement of the roller holder contact parts and the corresponding housing contact parts with one another.

2. The disk player according to claim 1, in which:

at least either one of said side plates is provided with an upper protuberance having the front roller holder contact part, one of the left and right roller holder contact parts and the upper roller holder contact part and a lower protuberance having the rear roller holder contact part, the other one of the left and right roller holder contact parts and the lower roller holder contact part;

said top plate of the housing is provided with an engagement aperture having housing contact parts corresponding to the front roller holder contact part, one of the left and right roller holder contact parts and the upper roller holder contact part, respectively, provided on the upper protuberance; and said bottom plate of the housing is provided with an engagement aperture having housing contact parts corresponding to the rear roller holder contact part, the other one of the roller holder contact parts and the lower roller holder contact part, respectively, provided on the lower protuberance.

3. The disk player according to claim 1, in which said roller holder is formed from a metal sheet.

4. The disk player according to claim 3, in which:

at least either one of said side plates is provided with an upper protuberance having the front roller holder contact part, one of the left and right roller holder contact parts and the upper roller holder contact part and a lower protuberance having the rear roller holder contact part, the other one of the left and right roller holder contact parts and the lower roller holder contact part;

said top plate of the housing is provided with an engagement aperture having housing contact parts corresponding to the front roller holder contact part, one of the left and right roller holder contact parts and the upper roller holder contact part, respectively, provided on the upper protuberance; and said bottom plate of the housing is provided with an engagement aperture having housing contact parts corresponding to the rear roller holder contact part, the other one of the roller holder contact parts and the lower roller holder contact part, respectively, provided on the lower protuberance.

* * * * *